(12) United States Patent
Schwarzkopf et al.

(10) Patent No.: US 9,353,662 B2
(45) Date of Patent: May 31, 2016

(54) FABRICATED MEDIA LINE AND USE IN AN SCR CATALYST SYSTEM

(75) Inventors: Otfried Schwarzkopf, Kürten (DE); Reinhard Plietsch, Wermelskirchen (DE); Tobias Etscheid, Lindlar (DE); Marco Isenburg, Ratingen (DE); Oliver Preiss, Ratingen (DE); Martin Sachse, Wipperfürth (DE)

(73) Assignee: VOSS Automotive GmbH, Wipperfurth (DE)

( * ) Notice: Subject to any disclaimer, the term of this patent is extended or adjusted under 35 U.S.C. 154(b) by 345 days.

(21) Appl. No.: 13/996,909

(22) PCT Filed: Dec. 16, 2011

(86) PCT No.: PCT/EP2011/073080
§ 371 (c)(1),
(2), (4) Date: Sep. 5, 2013

(87) PCT Pub. No.: WO2012/084721
PCT Pub. Date: Jun. 28, 2012

(65) Prior Publication Data
US 2013/0333772 A1  Dec. 19, 2013

(30) Foreign Application Priority Data
Dec. 22, 2010  (DE) .......................... 10 2010 055 520

(51) Int. Cl.
*F16L 53/00* (2006.01)
*F01N 3/20* (2006.01)

(52) U.S. Cl.
CPC .............. *F01N 3/2066* (2013.01); *F16L 53/00* (2013.01); *F16L 53/002* (2013.01); *F16L 53/005* (2013.01);
(Continued)

(58) Field of Classification Search
CPC .................... F01N 2610/11; F01N 2610/1486; F16L 53/00; F16L 53/005; F16L 53/008
See application file for complete search history.

(56) References Cited

U.S. PATENT DOCUMENTS 6,192,677 B1 * 2/2001 Tost ................................ 60/286
6,539,708 B1 * 4/2003 Hofmann et al. ............... 60/286
(Continued)

FOREIGN PATENT DOCUMENTS

CN       101313169 A     11/2008
CN       101551046 A     10/2009
(Continued)

OTHER PUBLICATIONS

International Search Report of PCT/EP2011/073080, Mailed on Jun. 14, 2012, 6 pages.

*Primary Examiner* — Kevin Murphy
(74) *Attorney, Agent, or Firm* — Eric J. Sosenko; Jonathan P. O'Brien; Honigman Miller Schwartz and Cohn LLP (57) ABSTRACT

An assembled media line, or a section of a media line, for connecting a tank to a dosing unit in order to add a reducing agent into a SCR catalyst system of an internal combustion engine. The fluid line has electric heating in some sections for heating of the fluid. The fluid line is additionally provided, at least in some areas, with fluid tempering. In use, the media line connects a tank to a dosing unit in order to add a reducing agent in a SCR catalyst system of an internal combustion engine, and wherein the engine coolant is used as tempering fluid. The tempering is achieved by inclusion of at least one tempering line running alongside the fluid line. A line connector for such a media line includes a connecting housing in which the fluid line and two tempering lines can be connected.

13 Claims, 6 Drawing Sheets

(52) U.S. Cl.
CPC ............ *F16L 53/008* (2013.01); *F01N 2240/02* (2013.01); *F01N 2610/10* (2013.01); *F01N 2610/11* (2013.01); *F01N 2610/1486* (2013.01); *Y02T 10/24* (2013.01); *Y10T 137/6606* (2015.04)

(56) References Cited

U.S. PATENT DOCUMENTS

| | | |
|---|---|---|
| 8,209,957 B2 | 7/2012 | Behrendt et al. |
| 2002/0166603 A1* | 11/2002 | Camacho et al. ............... 141/98 |
| 2006/0108443 A1* | 5/2006 | Huffman et al. ............... 239/132 |
| 2007/0079599 A1* | 4/2007 | Osaku et al. ..................... 60/283 |
| 2009/0064666 A1 | 3/2009 | Behrendt et al. |
| 2009/0308466 A1* | 12/2009 | Haeberer et al. ............... 137/334 |
| 2010/0242439 A1 | 9/2010 | Domon et al. |
| 2010/0263740 A1* | 10/2010 | Borgmeier et al. ........... 137/341 |
| 2010/0290764 A1 | 11/2010 | Borgmeier et al. |
| 2011/0006513 A1 | 1/2011 | Lechner et al. |
| 2011/0241333 A1 | 10/2011 | Borgmeier et al. |

FOREIGN PATENT DOCUMENTS

| | | |
|---|---|---|
| CN | 101836026 A | 9/2010 |
| DE | 202009006902 U1 | 8/2009 |
| DE | 102010016654 A1 | 11/2010 |
| EP | 0764810 A1 | 3/1997 |
| JP | 2009097479 A | 5/2009 |
| JP | 2009243279 A | 10/2009 |
| JP | 2010031942 A | 2/2010 |
| JP | 2010255608 A | 11/2010 |
| WO | 2007032034 A1 | 3/2007 |
| WO | 2008005829 A2 | 1/2008 |

* cited by examiner

FABRICATED MEDIA LINE AND USE IN AN SCR CATALYST SYSTEM

BACKGROUND

1. Field of the Invention

The invention relates to an assembled media line for conducting fluidic media with a fluid line having terminal line connectors, wherein the fluid line is provided with electrical heating means at least in some sections in order to heat the fluid. The invention more specifically relates to various components of such a media line and the use of the media line in a SCR catalyst system of an internal combustion engine.

2. Related Technology

Media lines with electric heating means for fluid heating are known; reference should be made herein as an example to document WO 2008/131993 A1. A freezing of the respective medium at low ambient temperatures is prevented, and/or the potentially already frozen medium can be thawed, by supplying heat by means of the electric heating means in the fluid line and the terminal line connector. This known media line is also preferably used for a urea solution, which is used as $NO_x$ reducing agent for diesel engines with so-called SCR catalysts.

The problem encountered in this preferred use of such media lines consists in particular in that the SCR dosing unit to be connected to a tank or pump is exposed to very high temperatures during operation due to its placement in an exhaust gas system branch of the internal combustion engine, which also applies in part to the area of the media line, connected to the closing unit, and its line connector connected to the dosing unit. In today's engine technology, and especially with the use of SCR catalysts, there is a tendency of introducing the reducing agent into areas of the exhaust gas system branch located ever closer to the engine. The reducing agent is introduced, for example, already behind an oxidation catalyst when a SCR catalyst combined with a diesel particulate filter to form one component or assembly is used. This leads to the situation that the dosing unit is exposed to ever higher temperatures, which accordingly also applies to the connected media line and the line connector.

SUMMARY

In one aspect, the present invention provide for an assembled media line of the described generic kind in such a way that it is particularly well suited for the described use for connection to a SCR catalyst dosing unit.

In another aspect of the invention, a fluid line is provided at least in some areas with tempering means for fluidic tempering of a component connected or to be connected by means of a tempering fluid over the connection area, in particular in a first terminal connection area, and in that the fluid line has at least one transition to an external feed and/or discharge line for the tempering fluid. In the preferred use, the tempering fluid is utilized to cool of the components to be connected via the connection area, especially a SCR dosing unit, wherein the heat coming from the exhaust gas system branch indirectly via the dosing unit, or also directly from the exhaust gas system branch, is effectively dissipated via the tempering fluid. Coolant of the internal combustion engine is especially used at the same time as tempering fluid.

The invention also relates—in addition to the overall assembled media line and its preferred use—to specific components, which are relevant to the invention. One such component is a line section having a longitudinal portion of the fluid line and tempering means for fluidic tempering. Another such component relates to a special line connector, via which the two tempering lines are or can be connected for the passage of the fluidic tempering agent.

Other advantageous embodiment features of the invention are comprised in the dependent claims and in the subsequent description.

BRIEF DESCRIPTION OF THE DRAWINGS

The invention will be described in greater detail on the basis of the drawings and the preferred exemplary embodiments and application examples illustrated therein. In the drawings.

DETAILED DESCRIPTION

As set out herein, the same components are always provided with the same reference numbers in the different figures of the drawings.

With regard to the subsequent description it is expressly emphasized that the invention is not limited to the exemplary embodiments and is thus not limited to all or several features of the described feature combinations, but each individual partial feature of the/each exemplary embodiment can also be important per se for the invention, also separately from all other partial features described in connection therewith, and also in combination with any of the features of another exemplary embodiment as well as also independently from the claims and their dependencies.

Figure 1:
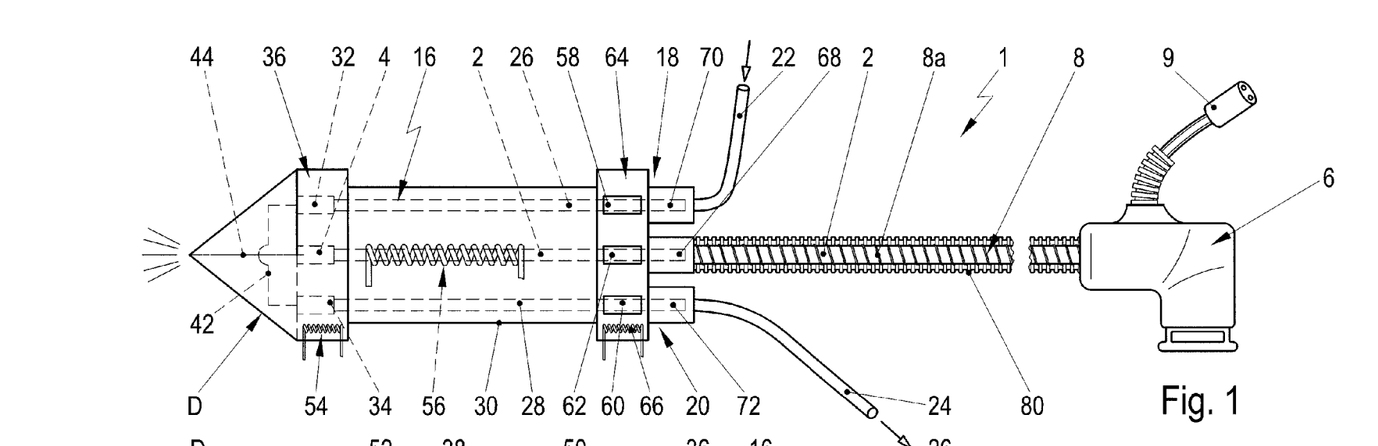
FIG. 1 shows a schematic lateral view of a media line according to the principles of the invention in a first embodiment with a connected dosing unit.

An assembled media line 1 according to the principles of the invention includes a fluid line 2 in the form of a hose line or pipeline, made in particular of plastic and having terminal line connectors 4, 6 preferably configured as fluid plug connectors, and specifically as plugs or plug housings, that is, sleeves. The fluid line 2 is provided with electrical heating means 8 for heating of fluid at least in some sections. In addition, at least one of the two line connectors 4, 6, and specifically in particular the line connector 6, can preferably be electrically heated. Also the other line connector 4 can optionally be electrically heated. The heating means 8 of the fluid line 2 consists preferably of at least one in particular helix-shaped winding running along the length of a suitable heat conductor 8a made from resistance wire. At least the second line connector 6, which is illustrated toward the right in FIG. 1, is likewise equipped with electric heating means—which are not visible in the illustration—for fluid heating, and can have branched electric line connections having a connector plug 9 for connection of an electric power supply or for connection to additional heating means, for example, an additional media line.

Figure 6:
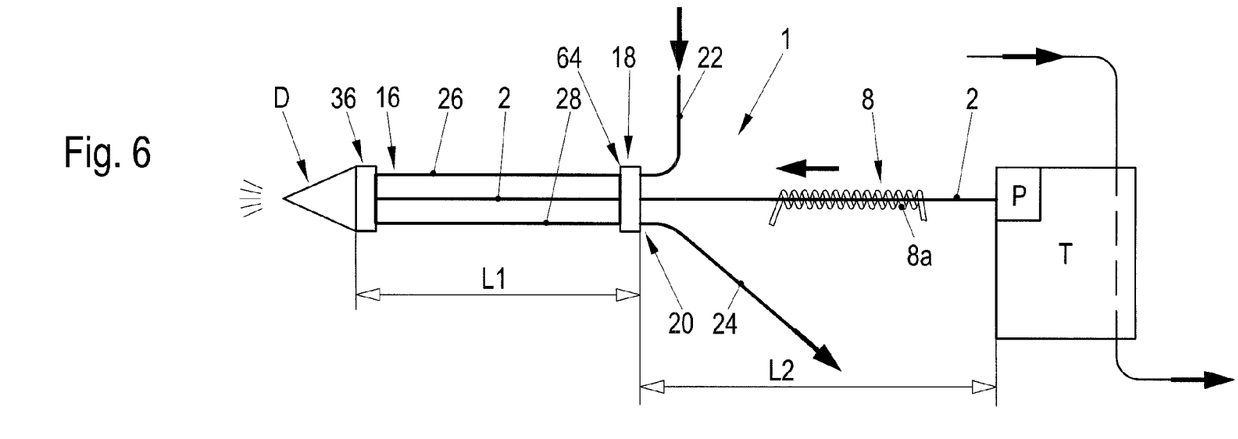
FIG. 6 shows a highly schematic illustration of the media line in a preferred use.
Figure 7:
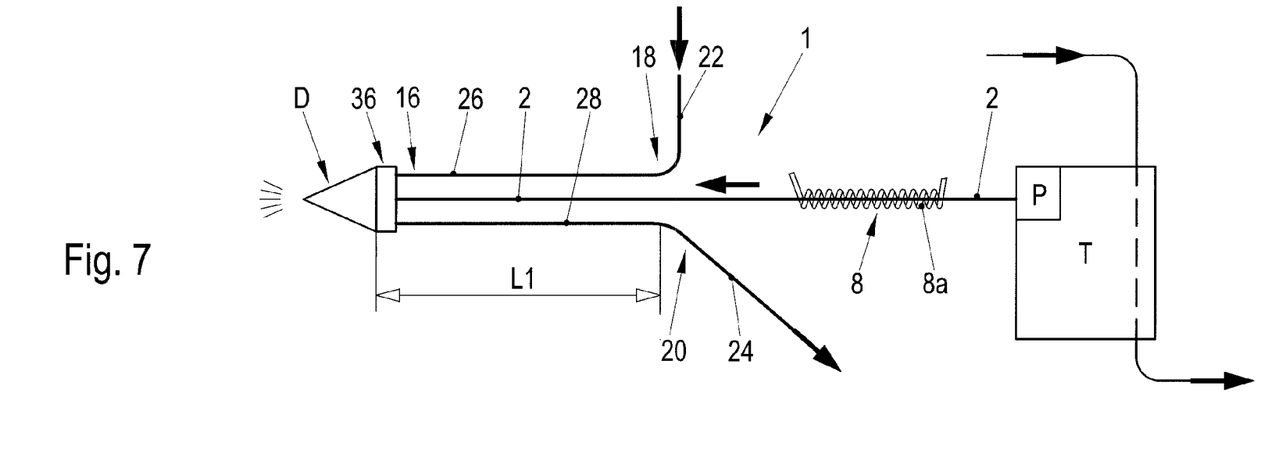
FIG. 7 shows a design variation of the media line seen in FIG. 6.
Figure 10:
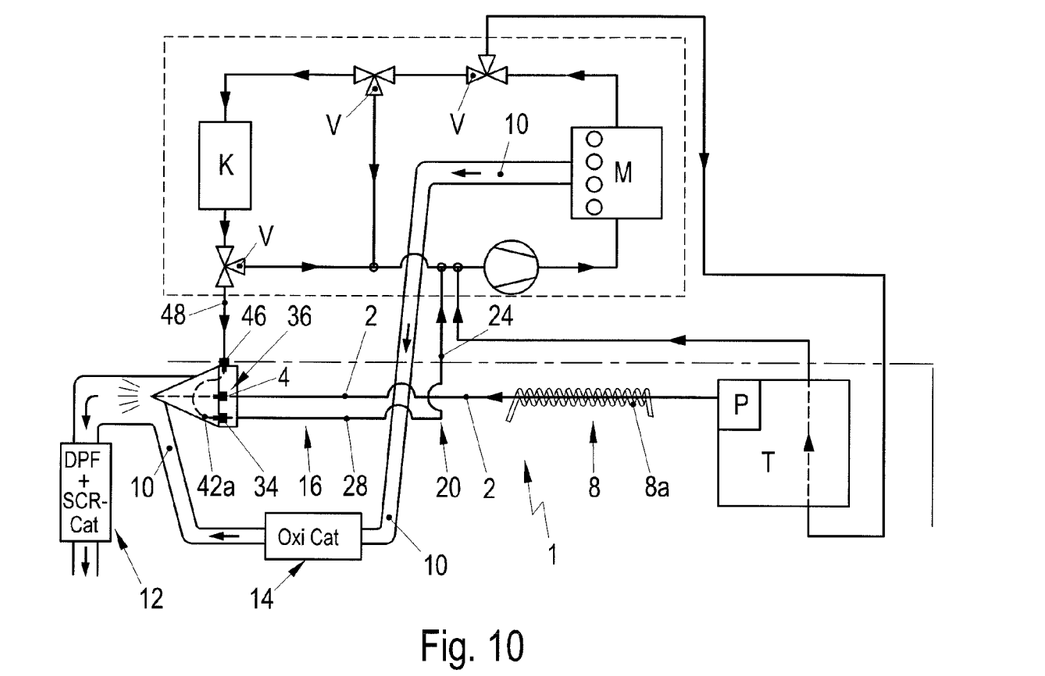
FIG. 10 shows a simplified schematic block diagram of an internal combustion engine with SCR catalyst in a preferred use of a media line according to the principles of the present invention.

According to FIGS. 6, 7 and 10, the media line 1 preferably serves for fluidic connection of a tank T or a pump P arranged there to a dosing unit D for addition of a fluidic reducing agent, in particular an aqueous urea solution, in a SCR catalyst system of an internal combustion engine M. The abbreviation SCR means "selective catalytic reduction." According to FIG. 10, the dosing unit D is arranged on an exhaust gas system branch 10 of an engine M in order to introduce the reducing agent into the exhaust gas flow, and specifically in the area ahead of a SCR catalyst 12 and behind an oxidation catalyst 14. The SCR catalyst 12 is preferably combined with a diesel particulate filter DPF to form one assembly. Considerably high temperatures occur in this area of the exhaust gas system branch 10 located relatively near the engine, so that the area of the media line 1 connected to the dosing unit D must be designed for a continuous operating temperature of 120° to 140° C. and short-term temperatures of as much as 220° C. for up to 15 minutes.

The media line 1 is provided according to the invention with tempering means 16 for fluidic tempering, in particular cooling by means of a tempering fluid, at least in some areas and at least in a terminal connection area of the fluid line 2, and has at least one transition 18 or 20 to an external feed line 22 and/or to an external discharge line 24 for the tempering fluid.

In the illustrated preferred embodiments, the tempering means 16 are formed by at least one tempering line 26 or 28, but in particular by two tempering lines 26 and 28, wherein one tempering line 26 forms an inlet flow and the other tempering line 28 forms an outlet flow for the tempering means. Each tempering line 26, 28 runs over a specific longitudinal portion alongside to the fluid line 2. In the illustrated embodiments they are individual closely neighboring lines, but it is also conceivable to connect the two to three lines to each other, for example, by firmly bonding or joining multiple lines to form a unit. The/each tempering line 26, 28, together with the fluid line 2, is preferably encased in a line sheath 30 across the respective specific longitudinal part. A line bundle of two to three individual or connected lines is consequently formed in this area.

In an additional preferred embodiment of the invention, each tempering line 26, 28 likewise has a line connector 32 and/or 34 in the first connecting area of the fluid line 2 having the first line connector 4. It is additionally advantageous in this connection if the line connectors 32, 34 of the tempering lines 26, 28 are configured as a multiple connector 36 jointly with the first line connector 4 of the fluid line 2, in particular for a joint plug connection to the dosing unit D. The multiple connector 36 is preferably configured plate-shaped as a "multiple coupling plate," wherein each line connector 4, 32, 34 is configured, as shown, as part of a fluid plug connection according to FIG. 2, preferably as a receiving sleeve for each plug set 38 of the dosing unit D. A sealing ring 40, which is arranged, for example, inside the receiving sleeve according to FIG. 2, but can alternatively also be arranged at the perimeter of the plugs of the plug set 38, is provided in order to seal the perimeter of each plug connector.

Figure 2:
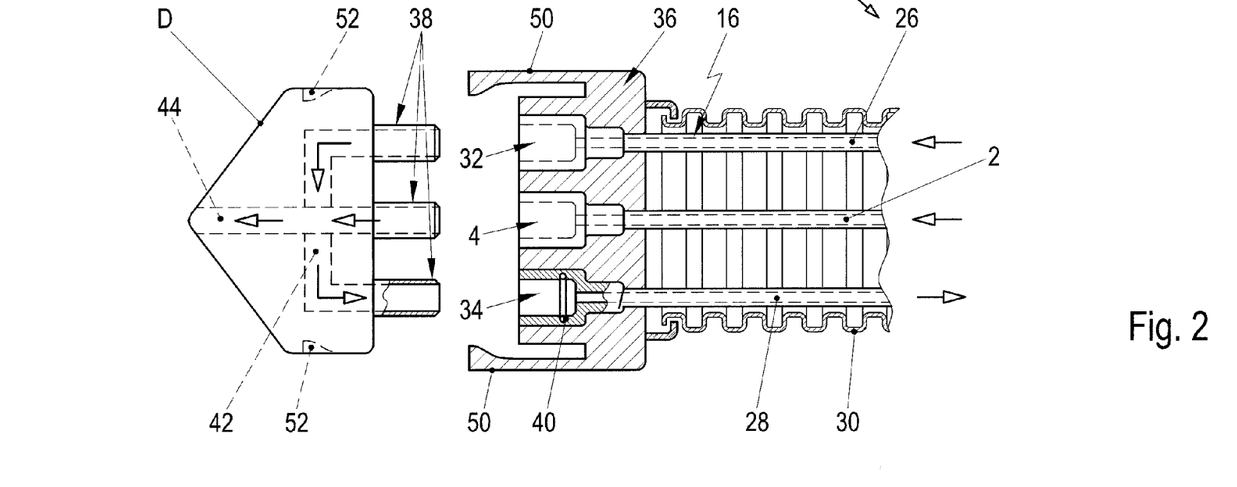
FIG. 2 shows an enlarged view, partially in section, of the first connection area of the media line according to the principles of the invention, with a separately illustrated dosing unit.

In the preferred embodiments with two tempering lines 26 and 28, these are connected or can be connected to each other according to FIGS. 1 and 2 via their line connectors 32, 34 and via a connection duct 42 running through the dosing unit D. The tempering fluid is consequently also fed through the dosing unit D, in this embodiment, so that the dosing unit D is likewise tempered, in particular cooled.

The fluid line 2 is connected or can be connected via its line connector 4 to a dosing duct 44 of the dosing unit D. The reducing agent fed via the fluid line 2 can thus be injected via the dosing duct 44 into the exhaust gas system branch 10; refer to FIG. 10.

In the exemplary embodiment depicted as an example in FIG. 10 with only one tempering line, as indicated for instance the tempering line 28, the multiple connector 36 is suitably provided with a connector 46 for direct connection of the feed or discharge line; in the illustrated example, a feed line 48 for the tempering fluid. The plate-shaped multiple connector 36 is then provided only with the line connector 4 for the fluid line 2 and a line connector for the tempering line, for example, 28, in the connection area to the dosing unit D. The line connector of the tempering line 28 is connected or can be connected at the same time to the connector 46 via a connecting duct 42a of the dosing unit D.

As is further evident from FIG. 2, the preferably provided multiple connector 36 is or can be locked with the dosing unit D. The multiple connector 36 configured as a molded plastic piece can be provided for this purpose with elastic locking arms 50, which engage by the terminal latches into locking recesses 52 of the dosing unit D when the plug connectors are joined.

As is further indicated in FIG. 1, the multiple connector 36 can optionally be provided with additional electric heating means 54 for fluid heating. A heating of the fluid can take place, if necessary, in certain operating states, in particular after long periods of standstill at low ambient temperatures.

Something similar applies also for the fluid line 2 in its longitudinal part having the fluidic tempering means 16. The fluid line 2 can here too be additionally equipped as needed with controllable electric heating means 56.

The or each tempering line 26, 28 is likewise provided with a line connector 58, 60 for detachably connecting the external feed line 22 and/or external discharge line 24 in the area of its transition 18, 20 located at a distance from the first connection area and the preferred multiple connector 36. These line connectors 58, 60 are configured—preferably together with a fluid connector 62, which divides the fluid line 2 into two sections—as multiple connectors 64. This multiple connector 64 can be configured in accordance with the multiple connector 36 described above, that is, likewise as a plate-shaped "multiple coupling plate." This multiple connector 64 can additionally also have additional optional electric heating means 66.

As is additionally evident from FIG. 1, the fluid line 2 is provided in this divided configuration with a plug connector part 68 for plug connection to the fluid connector 62. The external feed and discharge lines 22, 24 for the tempering fluid are each provided with a plug connector part 70 and/or 72 for plug connection with the corresponding line connector 58 and/or 60.

Figures 3, 4, 5:
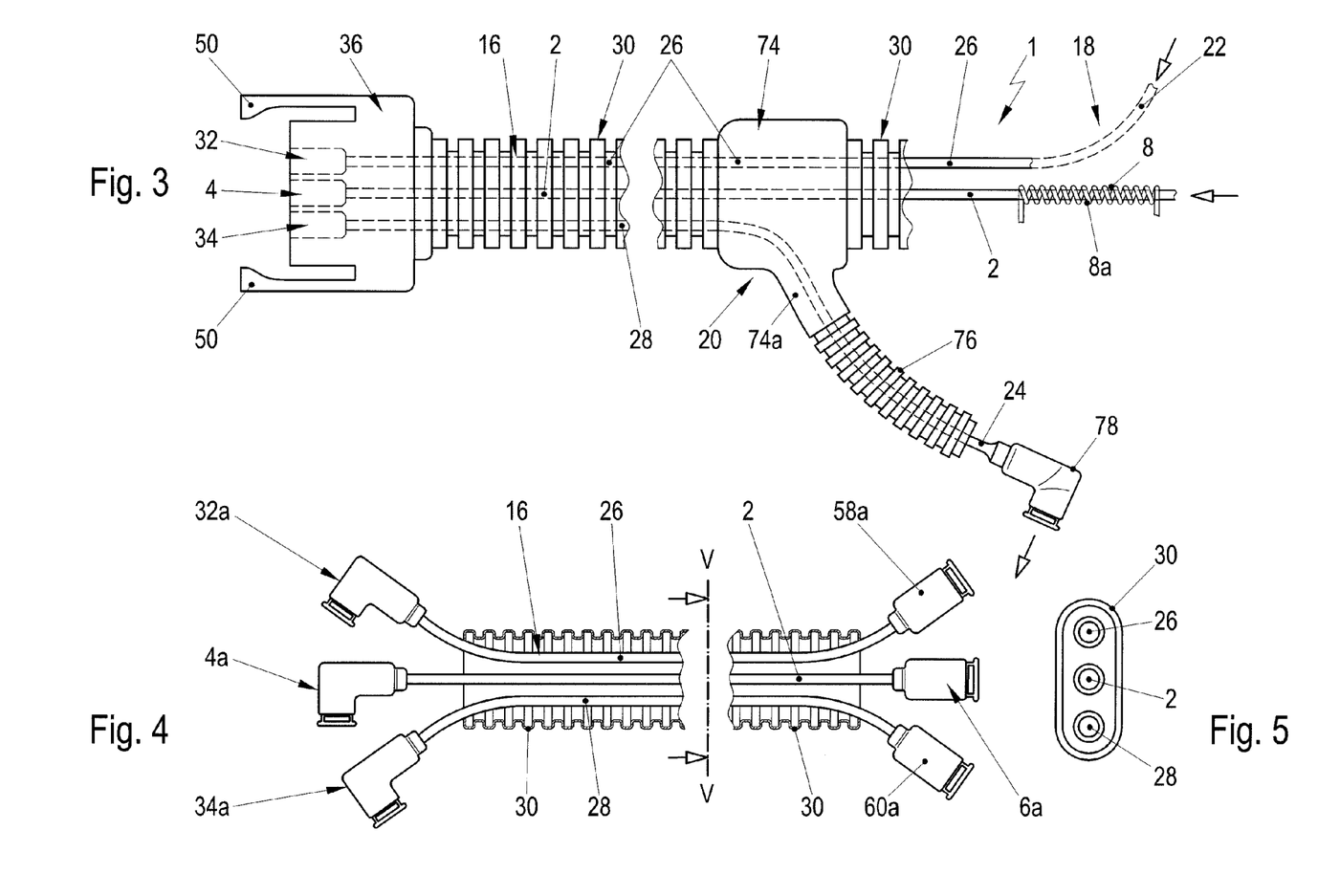
FIG. 3 shows a design variation of a media line according to the principles of the invention.
FIG. 4 shows a partial section of the media line.
FIG. 5 shows a cross section within plane V-V according to FIG. 4.

As an alternative to this preferred embodiment described above, it is indicated in FIGS. 3 and 7 that each tempering line 26, 28 passes continuously into the feed line 22 or the discharge line 24 in the area of its transition 18 and/or 20 located at a distance from the first connecting area. The continuous line can thus be guided and separated via a branching piece 74 of the line sheath 30, which is shown as an example in FIG. 3. The fluid line 2 can also pass through in this case without interruption. Each branched line is preferably also encased by a line sheath 76, as shown, for example, in FIG. 3 for the discharge line 24. Each of the lines 22 and 24 has a terminal line connector 78 as shown in FIG. 3 likewise only for the discharge line 24. The fluid line 2 is also provided with a line sheath 80 in the length area between the tempering means 16 and the terminal line connector 6; refer the representation in FIG. 1.

According to FIGS. 2 and 3, the line sheath 30 is preferably formed by a corrugated tube and connected at one end to the preferred multiple connector 36 and at the other end to the multiple connector 64 or the branching piece 74 (FIG. 3) in an interlocking manner, for example, by snap-in locking. Something similar applies also to the line sheath 76 according to FIG. 3 in the area of its connection to a branch 74a of the branching piece 74.

A line section of the media line 1 is also depicted in FIG. 4; said line section consists of a part of the fluid line 2 and at least parts of the tempering lines 26, 28. Each line is equipped on both ends with a single line connector. Taking into consideration configuration according to FIG. 1, the line connector of the fluid line 2 is identified by reference numerals 4a and 6a, and the line connector of tempering lines is identified with reference numerals 32a, 34a and 58a, 60a. The lines are also encased here by a line sheath 30. According to FIG. 5, said sheath can also have an oval cross section. However, a common multiple connector can also be provided at least at one end as an alternative to the individual line connectors.

Figure 8:
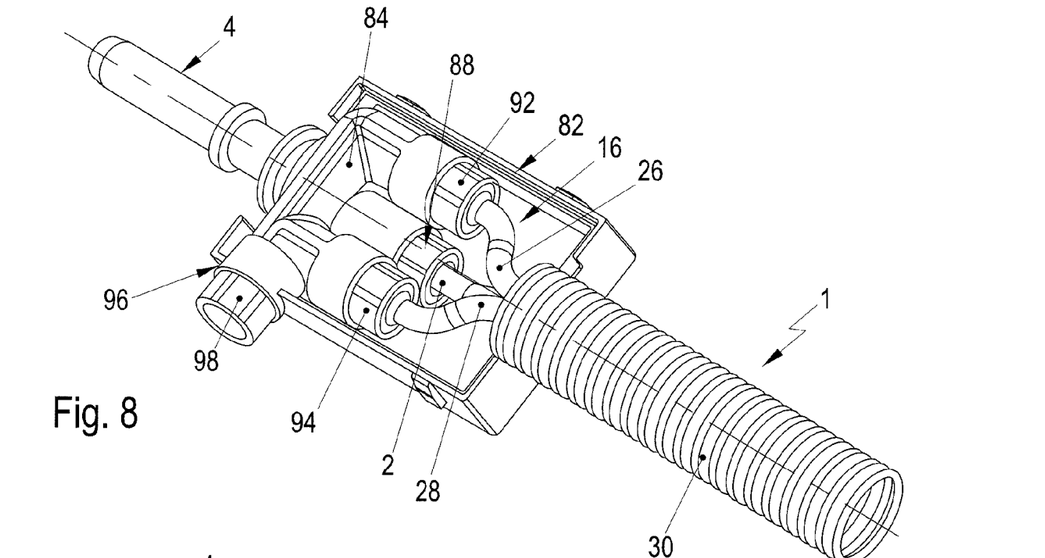
FIG. 8 shows a perspective view of a connecting housing with the housing being opened up to see the interior thereof.
Figure 9:
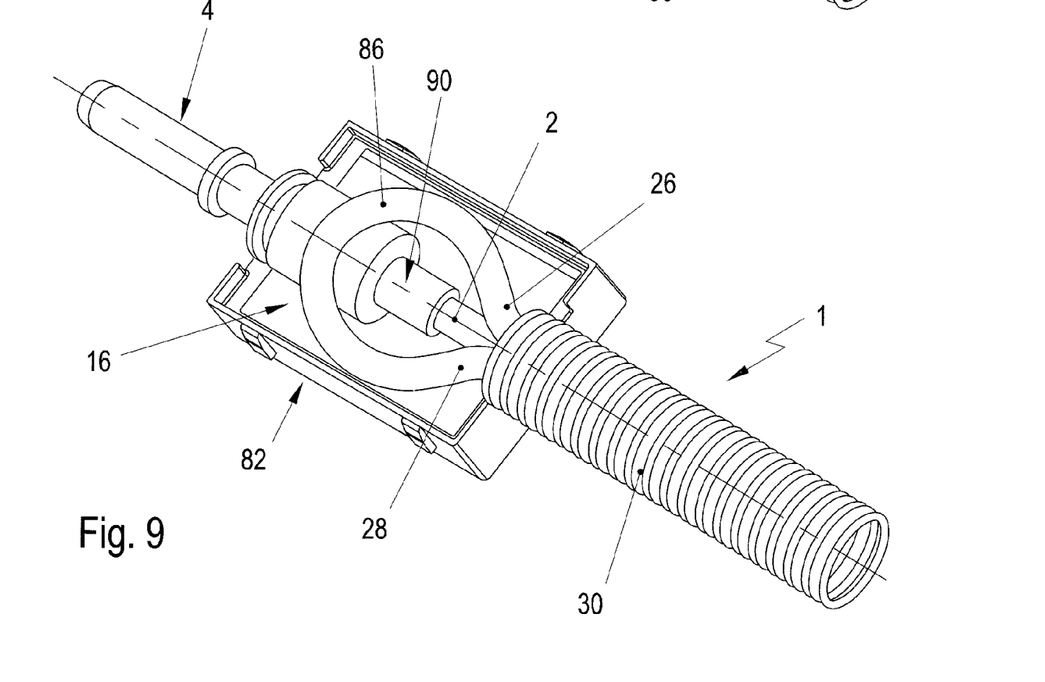
FIG. 9 shows a perspective view, similar to FIG. 8, of an alternative embodiment.

Now concerning the embodiments according to FIGS. 8 and 9, the first line connector 4 of the fluid line 2 is provided herein with a connecting housing 82 in which the two tempering lines 26 and 28 are mutually connected via an additional bypass connector piece 84 or continuously passes across a bypass loop 86. A tempering, in particular cooling, takes place in this way via the tempering fluid within the connection housing 82. The line connector 4 is configured herein as plug-in adapter, which protrudes from the connection housing 82. The fluid line 2 is suitably connected to the line connector 4, for example, according to FIG. 8 via a detachable line connector 88 or according to FIG. 9 in an undetachable and firmly bonded manner, in particular by welding, by means of a line housing 90. In the case of the configuration according to FIG. 8, the tempering lines 26, 28 can also be undetachably connected in the sense of FIG. 8, or can be connected via detachable line connections 92, 94 as shown in FIG. 8. FIG. 8 also shows that the bypass connector 84 can have an additional connector 96, which is sealed during operation by means of a plug 98. The tempering system can be filled and/or vented, for example, via the connector 96.

In addition, it should also be mentioned that the individual lines 2, 26, 28 are or can be guided and secured by means of spacers, which are not depicted, within the line sheath 30. A thermal insulation can furthermore be placed, if necessary, between the individual lines, or means can be provided for an intentional specific transfer of heat. In particular a direct heat exchange between the two tempering lines 26, 28 can be prevented through suitable means. A heat exchange between the fluid line 2 and at least one of the tempering lines 26 and/or 28 is however possible.

Reference is again made to FIG. 10 now with regard to the preferred use of the media line 1 according to the invention. The media line 1 according to the invention connects a tank T or a dosing pump P to the dosing unit D in order to inject a fluidic reducing agent, in particular an aqueous urea solution, into the exhaust gas system branch 10 of the SCR catalyst system. The coolant of the internal combustion engine M is used as tempering fluid in this preferred use. A cooling is produced in this way due to the high temperature prevailing in the area of the exhaust gas system branch 10. It is particularly practical for this purpose to use the cooled coolant from the engine radiator K cooling system return line as tempering fluid and to feed the tempering means 16 according to the invention across the external inlet line 48 and/or 22. The cooling liquid then flows preferably through the dosing unit D and via the tempering line 28 and the discharge line 24 back to the engine coolant cycle. The tempering means 16 are accordingly connected to the radiator return line of the engine M. According to FIG. 10, the tempering line 28 can pass continuously into the branched discharge line 24, but a division point can also be provided preferably as a plug connection.

Figure 11:
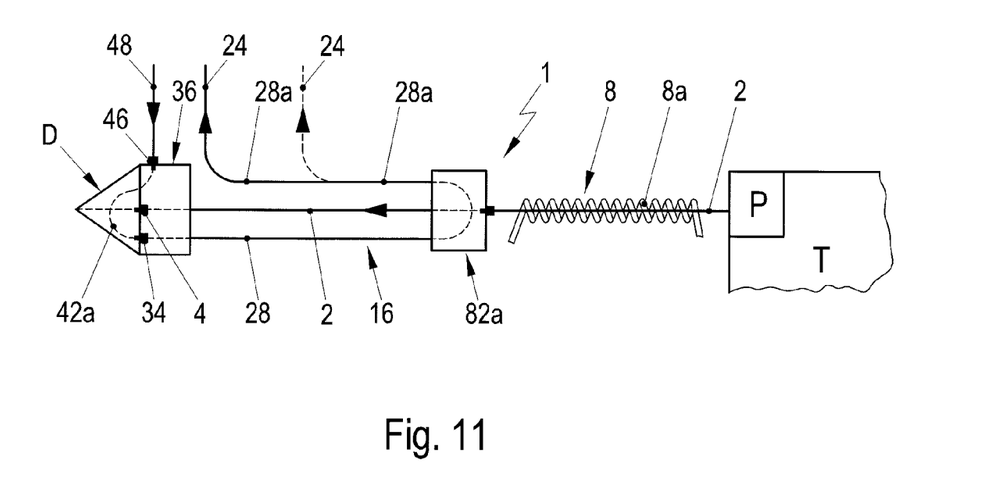
FIG. 11 shows a section of FIG. 10 in a design variation of a media line according to the principles of the invention.

As shown for example in FIG. 11, the tempering line 28 can also be looped back in the area of a division point in the fluid line 2 and can run as second tempering line 28a along any particular length along the fluid line 2 and then branch off into the discharge line 24. A line connector with a connection housing 82a, similar to a configuration according to FIG. 8 or 9, can be used for this loop-back of the tempering line 28, 28a.

The fluid present in the tank T can be additionally heated, and specifically likewise via the engine coolant, wherein here preferably the coolant heated by the engine M is fed from the radiator feed line through the tank T.

As is also shown in FIGS. 6 and 7, the entire length of the fluid line 2 is divided into two sections. A first section having the invented tempering means 16 is identified with L1, and a remaining second section is identified with L2. The partial length L1 is preferably clearly shorter than the partial length L2; with a total length L=L1+L2, L1 is then preferably 5% to 40% of L. The fluid line 2 is equipped with electric heating means 8 along the length L2. The length L1 will be, as a rule, within a range of 0.2 to 1.0 m, in particular about 0.5 m, for practical uses. The length L2 will be within the range of 0.5 to 10 m, in particular 3 to 4 m.

According to FIG. 7, the feed line 22 and the discharge line 24 can also be branched at different points spaced at intervals along the length of the fluid line 2, and specifically as needed or according to the particular spatial conditions within the respective vehicle.

Figure 12:
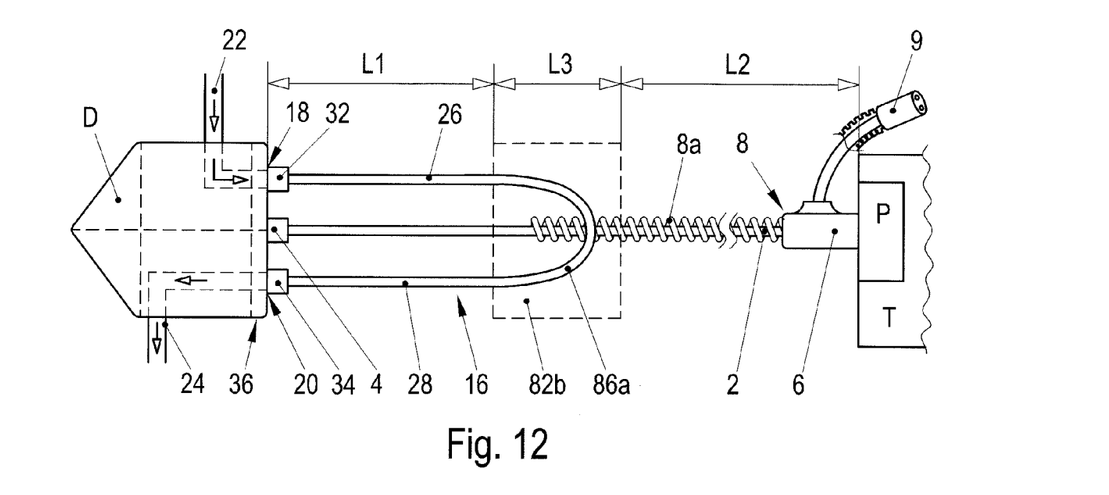
FIG. 12 shows another design variation of a media line according to the principles of the invention, in a schematic representation similar to FIG. 11.
Figure 13:
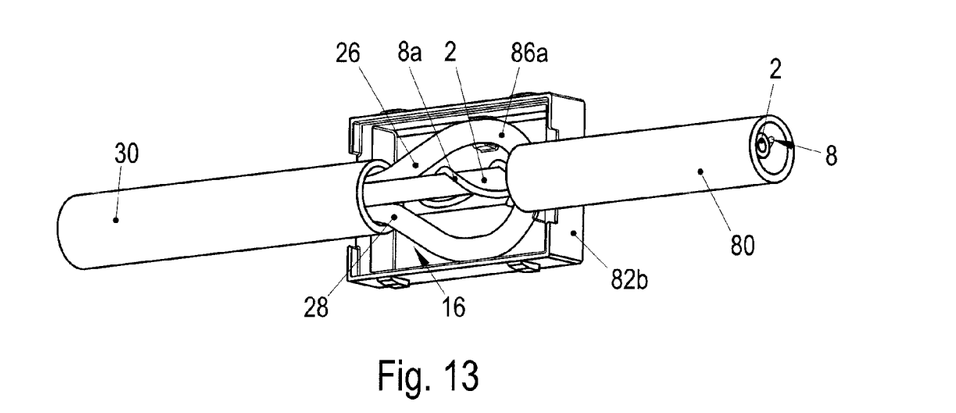
FIG. 13 shows a perspective view of a portion of the media line in an exemplary embodiment of the design according to FIG. 12.
Figure 14:
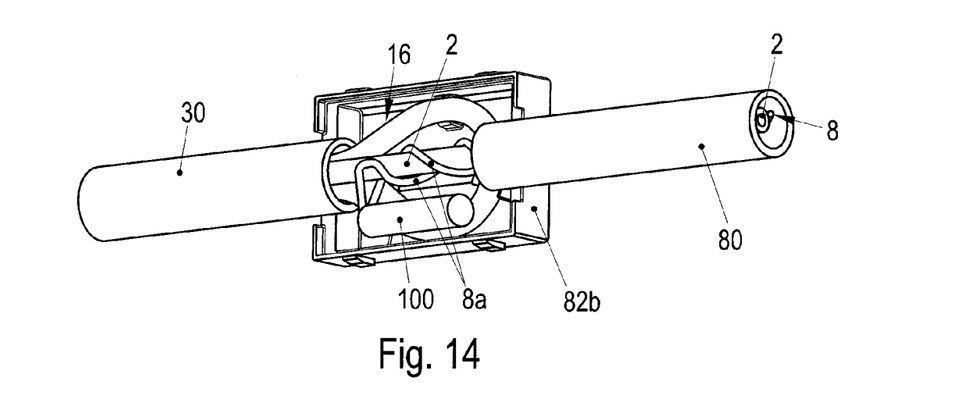
FIG. 14 shows a view of another embodiment similar to the one shown in FIG. 13.

As is additionally shown in FIGS. 12 to 14, the feed line 22 and the discharge line 24 can also be connected to the dosing unit D, wherein they pass into the tempering lines 26, 28 via the transitions 18, 20 running as ducts through the dosing unit D. The dosing unit D is thus likewise tempered in this configuration. The lines according to FIGS. 13 and 14 run through a line housing 82b in the area of the division point in the fluid line 2 mentioned above, while the tempering lines 26, 28 are connected throughout via a bypass loop 86a. A bypass connector piece 84 according to FIG. 8 can also be provided as an alternative. Only a lower portion of the line housing 82b is shown; a cover-like upper part is missing in order to allow a view into the interior. The tempering means 16 according to the invention and the electric heating means 8 can overlap over a length L3—as illustrated—refer to FIG.

12—within the line housing 82b. The electric heating means 8 are mounted on the fluid line 2, preferably also in the area of the line housing 82b, for example, by means of an adhesive tape winding and/or in the line housing 82b by means of suitable locking elements. In this configuration, the fluid line 2 can be divided in the area of the line housing 82b by means of connectors, for example, plug connectors (not illustrated) or can run through the line housing 82b without interruption. The line sheaths 30, 80 can be held at the end in the line housing 82b. According to FIG. 14, at least one connection point 100 for the heat conductor 8a of the electric heating means can be arranged inside the line housing 82b, wherein the/each connection point 100 can be designed as a crimp connector, preferably with a suitable insulating sheath, for example, of shrink-wrap tubing. In addition, means can preferably be provided within the line housing 82b for securing of the individual lines 2, 26, 28 and of the bypass loop 86a. Reference is made in addition to the embodiments already described and to the consistent reference characters. This also applies in particular to the longitudinal division L1, L2.

Because the heating and tempering means can be selectively controlled, the media line according to the invention allows an optional cooling and/or heating function. An electric heating can be combined in some sections with a fluidic heating or cooling. A heating also takes place in dependence upon the operating state as a result of tempering means 16 according to the invention. The tempering means 16 can also be controlled, for example, with a thermostat. The total mass flow of engine coolant or however only a small portion thereof can be fed via the feed line 22 (FIGS. 1, 3, 6, 7 and 12) or 48 (FIGS. 10, 11). An additional pump (not illustrated) can moreover be provided if needed in the feed line 22 and/or 48.

The invention is not limited to the illustrated and described exemplary embodiments, but rather comprises all equivalent embodiments in the sense of the invention. It is expressly emphasized that the exemplary embodiments are not limited to all features in combination, but rather each individual partial feature can also have inventive importance on its own also separately from all other partial features. The invention is furthermore not limited to the combination of features defined in the respective independent claim, but can rather also be defined by any other desired combination of specific features of all disclosed, individual features. This means that basically practically each individual feature of the respective independent claim can be omitted and/or substitute by at least one individual feature disclosed elsewhere in the application. The claims are to be understood insofar merely as an initial attempt at formulating an invention.

The invention claimed is:

1. An assembled media line for connecting a tank (T) to a dosing unit (D) in order to add a fluid that is a reducing agent into a SCR catalyst system of an internal combustion engine (M), the media line comprising:
a fluid line extending between terminal line connectors and provided with electrical heating elements at least in some sections to heat the fluid,
a tempering member adjacent to at least a portion of the fluid line for tempering of the fluid with a tempering fluid, the tempering member including at least one transition to at least one of an external feed line and an external discharge line for the tempering fluid, the tempering member including at least one tempering line defining an inlet line and a return line and extending alongside at least part of the length of the fluid line, the at least one tempering line further including a tempering line connector in a first connection area, the tempering line connector being provided as part of a multiple connector together with the terminal line connector of the fluid line for plug connection to the dosing unit (D), wherein the multiple connector snaps into the dosing unit (D) and is provided with an electrical heating element for heating the fluid.

2. The media line according to claim 1, wherein the at least one tempering line is enclosed together with the fluid line by a line sheath.

3. The media line according to claim 2, wherein the at least one tempering line is guided via a branching piece of the line sheath through the transition area which is located at a distance from a first connection area.

4. The media line according to claim 1, wherein at least one of the terminal line connectors includes a connector housing in which the at least one tempering line passes as a single piece or two pieces connected to each other via a connecting piece.

5. The media line according to claim 1, wherein the at least one tempering line includes two tempering lines connected to the dosing unit (D) via two tempering line connectors and connected together by a connecting duct defined in the dosing unit (D).

6. The media line according to claim 1, wherein the at least one tempering line includes one tempering line and the multiple connector further includes one of a feed and discharge connector for connecting to a feed or discharge line for the tempering fluid, the tempering line connector being connected to the one of a feed and discharge connector via a connecting duct of the dosing unit (D).

7. The media line according to claim 1, wherein a line sheath is formed by a corrugated tube and is joined in an interlocking manner to the multiple connector.

8. The media line according to claim 1, wherein the fluid line is provided with the electrical heating elements in an area where the tempering member is located.

9. The media line according to claim 1, used to connect a tank to a dosing unit in order to add the fluid into a SCR catalyst system of an internal combustion engine (M), and wherein engine coolant is used as tempering fluid.

10. The media line according to claim 1, further comprising a connecting housing in which the fluid line is connected, and in which at least two tempering lines are connected by an additional connecting piece.

11. An assembled media line for connecting a tank (T) to a dosing unit (D) in order to add a fluid that is a reducing agent into a SCR catalyst system of an internal combustion engine (M), the media line comprising:
a fluid line extending between terminal line connectors and provided with electrical heating elements at least in some sections to heat the fluid,
a tempering member adjacent to at least a portion of the fluid line for tempering of the fluid with a tempering fluid, the tempering member including at least one transition to at least one of an external feed line and an external discharge line for the tempering fluid, the tempering member including at least one tempering line defining an inlet line and a return line and extending alongside at least part of the length of the fluid line, the at least one tempering line being provided with a detachable line connector for detachable connection to at least one of an external feed line and discharge line in the transition area located a distance from a first connection area, the detachable line connector being a multiple connector and being further provided with a fluid connector that divides the fluid line into two sections, the multiple connector being provided with an electrical heating element for heating of the fluid.

12. An assembled fluid media line for connecting a tank (T) to a dosing unit (D) for a reducing agent in an SCR catalyst system of an internal combustion engine (M), the media line comprising:
- a fluid line having first and second line connectors at terminal ends thereof;
- a tempering member provided adjacent to at least a portion of the fluid line for tempering the fluid with a tempering fluid, the tempering member including at least one transition connected to an external feed line and/or an external discharge line for the tempering fluid, wherein the tempering member includes at least one tempering line extending alongside at least part of the length of the fluid line;
- the at least one tempering line being connected to a first line connector in a first connection area in which the at least one the tempering line is connected to the dosing unit (D), the first line connector of the at least one tempering line together with the first line connector of the fluid line forming a first multiple connector for plug connection with the dosing unit (D);
- the at least one tempering line being further provided with a second line connector for detachable connection to at least one of the external feed line and the external discharge line in a transition area located at least a distance from the first connection area; and
- the second line connector of the at least one tempering line together with a fluid connector of the fluid line forming a second multiple connector, the second multiple connector dividing the fluid line into a first section including the tempering member and a second section not including the tempering member, whereby the first and second multiple connectors provide a common plug connections of the fluid line and the at least one tempering line.

13. Assembled media line for conducting fluid media, having a fluid line which has end-side line connectors and which serves in particular for connecting a tank (T) to a dosing unit (D) for a reductant additive in an SCR catalytic converter system of an internal combustion engine (M), wherein the fluid line has, at least in regions, fluid-based temperature control of the fluid line by way of a temperature control fluid, the fluid-based temperature control having at least one transition to an external feed line and/or to an external discharge line for the temperature control fluid, wherein the fluid-based temperature control is formed by a temperature control line which conducts the temperature control fluid, the temperature control line runs adjacent to the fluid line over a certain length section of the fluid line wherein an exchange of heat is possible between the fluid line and the temperature control line, in a first attachment region the temperature control line has a line connector formed as a multiple connector together with one of the end-side line connectors of the fluid line, and wherein the temperature control line has in a region of the transition a line connector for detachable attachment of the external feed and/or discharge line, wherein the region of the transition is spaced apart from the first attachment region and the line connector situated in the region of the transition is formed as a multiple connector together with a fluid connector that divides the fluid line into two sections.

* * * * *